H. B. Beckman,
Governor.
No. 36,699. Patented Oct. 21, 1862.
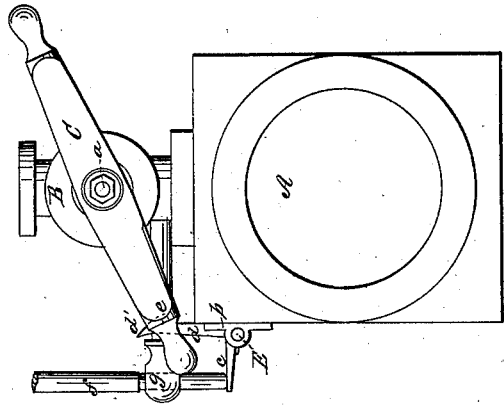
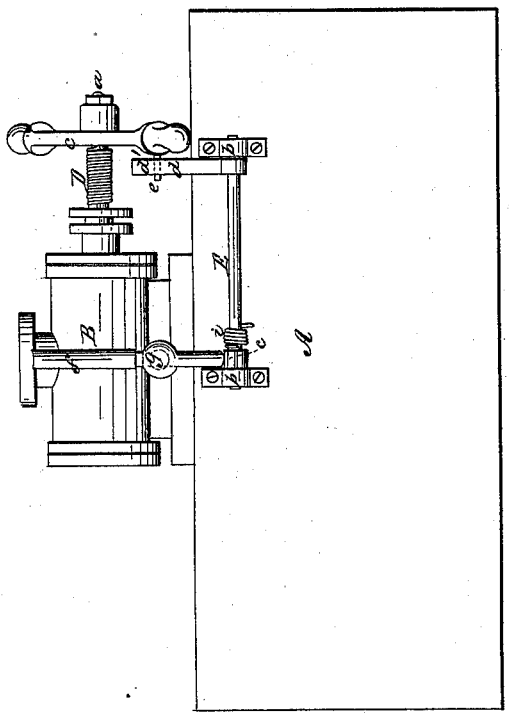
Witnesses:
J W Coombs
G. W. Reed
Inventor;
H B. Beckman
per Munn & Co
atty.

UNITED STATES PATENT OFFICE.

HORATIO B. BECKMAN, OF NEWBURYPORT, MASSACHUSETTS.

IMPROVED AUTOMATIC STOP-MOTION FOR STEAM-ENGINES.

Specification forming part of Letters Patent No. 36,699, dated October 21, 1862.

*To all whom it may concern:*

Be it known that I, HORATIO B. BECKMAN, of Newburyport, in the county of Essex and State of Massachusetts, have invented a new and Improved Automatic Stop-Motion for Steam-Engines and other Motors; and I do hereby declare that the following is a full, clear, and exact description of the same, reference being had to the accompanying drawings, forming part of this specification, in which—

Figure 1 is a side view of a steam-engine cylinder having my invention applied. Fig. 2 is an end view of the same.

Similar letters of reference indicate corresponding parts in both figures.

The object of my invention is to effect automatically the stoppage of a steam engine, water-wheel, or other motor regulated by a governor whenever the governor stops, owing to the breakage or slipping off of its driving-band or from any other cause. I employ for the stoppage of the motor a stop-valve or gate having a spring-weight or other device applied to close it when it is not held open by other means; and my invention consists in a certain arrangement, in combination with the valve and in relation to the governor, of a hook or catch which holds the valve open while the governor is in operation, but which is caused by the stoppage of the governor to liberate the valve and allow it to be closed by the weight, spring, or other device applied for the purpose.

To enable others skilled in the art to make and apply my invention, I will proceed to describe its construction and operation.

A is the cylinder of the engine, having arranged on the top of its steam-chest the stop-valve B, which opens and closes by a rotary or circular motion.

$a$ is the valve-stem, having attached to it a lever, C, and having applied to it a coiled spring, D, which exerts a constant tendency to turn it in a direction to close the valve.

E is a shaft arranged to oscillate in fixed bearings $b\ b$, and having fast upon it two arms, $c\ d$, the former of which is straight and arranged to occupy a nearly horizontal position, and the latter made with a hook, $d'$, and arranged to occupy a nearly vertical position, in which position it is capable of hooking on to a pin, $e$, that is secured in the lever C, and thereby holding the stop-valve in an open position. A spring, $i$, is coiled around the shaft and secured in such manner as to make it press the hook $d'$ forward against the pin $e$, and hold it thereon. The shaft E and arms $c\ d$ constitute a lever, to which the bearings $b\ b$ are the fulcrum.

$f$ is a vertical rod working through a fixed guide, $g$, and situated directly over the horizontal arm $c$ of the lever, and connected with the governor in such a manner as to rise and fall with the action of the governor, and not to touch the arm $c$ while the governor is in operation, but to drop upon the arm $c$ when the governor stops from any cause. When the valve is opened to start the engine, the hook $d'$ is hooked onto the pin $e$, and so long as the governor remains in operation the valve is held open by the said hook; but when the governor stops the rod $f$ is brought down upon the arm $c$, and by pressing down upon the said arm causes the arm $d$ to be thrown back and the hook $d'$ to be disengaged from the pin $e$, and leave the valve under the control of the spring D, which closes it instantly.

The invention may be applied to the gate of a water-wheel, or to the stop-valve or gate of any other motor, in substantially the same manner as above described, and a globe-valve or any other valve closing by a screw may be employed.

A weight may be substituted for a spring, and the weight may operate on a cord running over pulleys suitably arranged.

What I claim as my invention, and desire to secure by Letters Patent, is—

The catch-lever E $c\ d$, arranged and applied in relation to the governor, and in combination with the stop-valve or gate, substantially as and for the purpose herein specified.

H. B. BECKMAN.

Witnesses:
  NATH. PIERCE,
  N. Q. STOCKMAN.